United States Patent [19]

Komo et al.

[11] 3,929,920
[45] Dec. 30, 1975

[54] PROCESS FOR CONTINUOUS FLUORINATION OF CARBON

[75] Inventors: Tetsuya Komo, Ikeda; Satoshi Mizobata, Takatsuki; Rokuo Ukaji, Ibaraki; Tutomu Kamihigoshi, Takatsuki, all of Japan

[73] Assignee: Daikin Kogyo Co., Ltd., Osaka, Japan

[22] Filed: May 30, 1974

[21] Appl. No.: 474,805

[30] Foreign Application Priority Data
June 11, 1973  Japan.............................. 48-66037
May 31, 1973  Japan....................... 48-64560[U]

[52] U.S. Cl. ............. 260/653.9; 260/653; 423/439; 423/489; 23/283; 23/284
[51] Int. Cl.² ........................................ C07C 17/00
[58] Field of Search............. 260/653, 653.8, 653.9; 423/439, 489; 23/283

[56] References Cited
UNITED STATES PATENTS

| | | | |
|---|---|---|---|
| 2,257,533 | 9/1941 | Reich................................... | 23/283 |
| 2,774,797 | 12/1956 | Mantell et al..................... | 260/653.9 |
| 2,993,567 | 7/1961 | Schachner et al. ............... | 260/653.9 |

FOREIGN PATENTS OR APPLICATIONS

| | | | |
|---|---|---|---|
| 622,218 | 5/1927 | France................................ | 23/283 |

*Primary Examiner*—D. Horwitz
*Attorney, Agent, or Firm*—Armstrong, Nikaido & Wegner

[57] ABSTRACT

A reactor suitable for continuous fluorination of carbon materials having a plurality of trays and a wiper provided over the each tray which serves as both means for leveling the carbon material on the tray and means for wiping off the carbon material on the tray to another tray positioned just downward, and a process for continuous fluorination of carbon materials by employing the reactor. By employing the reactor, the production capacity per bed area of reactor is widely increased and the reaction heat is readily eliminated to avoid the degradation or combustion of polycarbonmonofluoride.

10 Claims, 2 Drawing Figures

PROCESS FOR CONTINUOUS FLUORINATION OF CARBON

BACKGROUND OF THE INVENTION

The present invention relates to a process for continuously fluorinating carbon materials suitable for the mass-production of polycarbonmonofluoride.

Recently, polycarbonmonofluoride has become the object of public attention as a new industrial material and has been applied to various uses, for instance, as an active material for primary cells of high energy density, as a solid lubricant contained in liquid lubricants, greases and coating compositions, as a fluorinating agent, and the like. Therefore, the demand for polycarbonmonofluoride has increased and there has been desired the mass-production of polycarbonmonofluoride.

Polycarbonmonofluoride is prepared by reacting carbon materials with fluoride gas, for instance, as described by O. Ruff and O. Bretschneider, in Z. anorg. u. allg. Chem. 217, 1 (1934) and W. Rudorff and O. Rudorff, in Z. anorg. u. allg. Chem. 253, 281 1947). In the past, there has been adopted batch process in which the reaction is carried out by passing fluorine gas diluted with a inert gas into reactor wherein a carbon material is placed without any forced transference and the reaction product is taken out of the reactor after the completion of reaction. However, in such batch process, there have been problems of low production capacity per bed area of reactor and further of frequent occurrence of degradation or combustion of polycarbonmonofluoride formed in the course of the reaction, which is caused by the accumulation of reaction heat resulting from the low thermal conductivities of carbon materials being the starting material and polycarbonmonofluoride being the product. Further, it has been problems that the batch process requires much labor for taking the carbon material into reactor and taking polycarbonmonofluoride formed out of a reactor and that the batch process requires much time for heating and cooling of the reactor at every batch reaction since the reaction of carbon materials with fluorine gas is carried out at comparatively high temperatures (usually, 250° to 600°C.). In addition, reactors employed for batch process have problems such as low elimination efficiency of reaction heat.

Thus, in the prior art, it has been much difficult to mass-produce polycarbonmonofluoride due to the above-mentioned problems associated with the employment of batch process.

OBJECTS OF THE INVENTION

An object of the present invention is to provide a process suitable for the mass-production of polycarbonmonofluoride, with eliminating the above-mentioned problems associated with the employment of batch process.

Another object of the invention is to provide a process for continuous fluorination of carbon materials.

Further object of the invention is to provide a reactor preferably employed in continuous process.

These and other objects of the invention will become apparent from the description hereinafter.

DETAILED DESCRIPTION OF THE INVENTION

Figure 1:
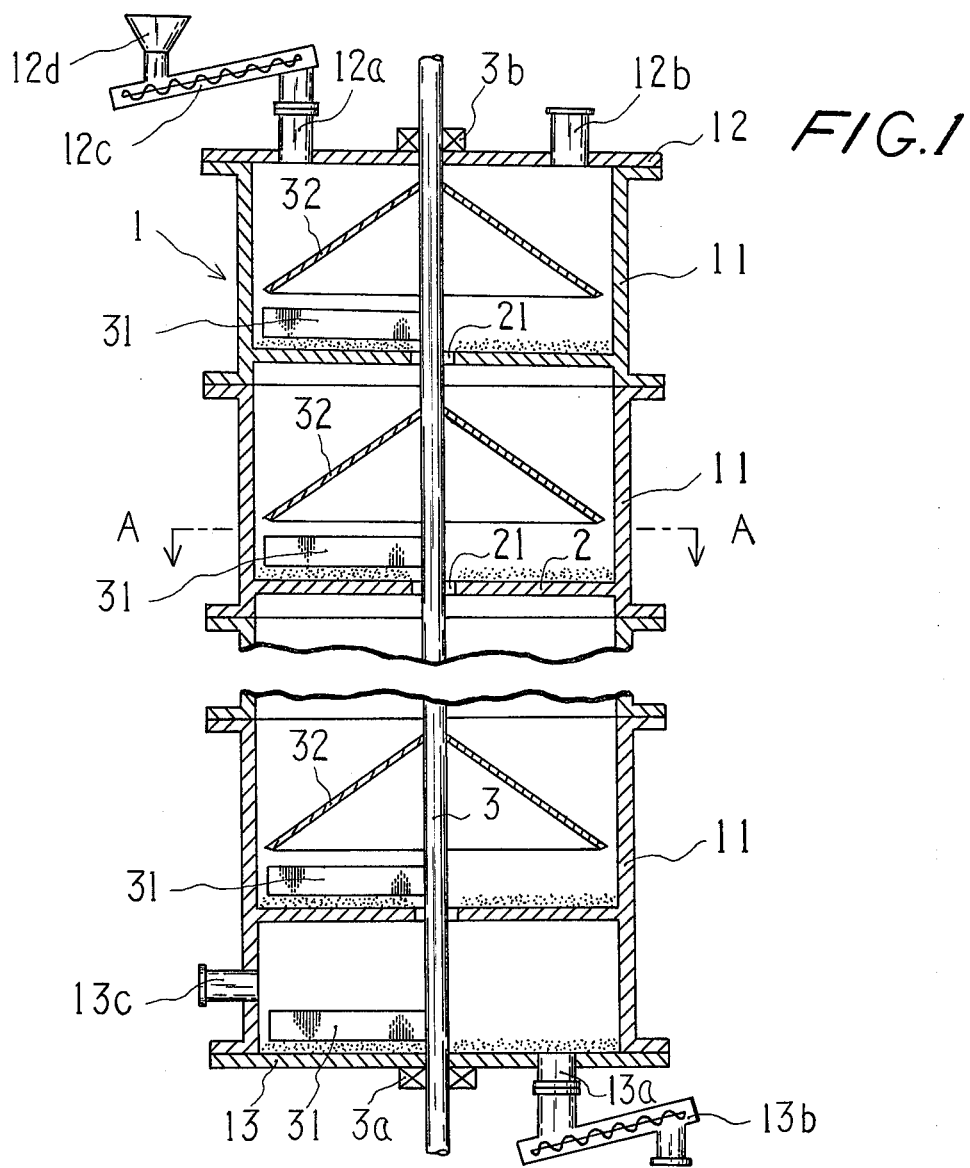
FIG. 1 is a vertical sectional view of the preferred reactor employed in the practice of the present invention.

It has now been found that the above-mentioned objects are accomplished by a continuous fluorination of carbon materials which comprises:

employing a multistage cylindrical reactor having a plurality of trays and a wiper provided over the each tray which serves as both means for leveling a powdery solid on the tray and means for wiping off the powdery solid on the tray to another positioned just downward, and reacting carbon materials with fluorine gas by the process comprising of the following steps:

a. continuously supplying a carbon material into the reactor from the upper part of the reactor and continuously supplying fluorine gas into the reactor from the lower part of the reactor, b. reacting the carbon materials on the trays with fluorine gas rasing from the lower part of the reactor, with transferring the carbon material partially fluorinated in the course of fluorination from an upper tray to a lower tray by means of the wipers, c. continuously taking out polycarbonmonofluoride prepared from the lower part of the reactor.

According to the present invention, the production capacity per bed area of reactor increases remarkably since polycarbonmonofluoride can be prepared in a continuous manner by continuously reacting carbon materials with fluorine gas. In the present invention, the carbon material supplied is transferred in succession from an upper tray to a lower tray with increasing the degree of fluorination thereof. In consequence, the fresh carbon material supplied on the uppermost tray and the carbon material being poor in polycarbonmonofluoride on upper trays contact with a lower concentration of fluorine gas and the carbon material being rich in polycarbonmonofluoride on lower trays contacts with a higher concentration of fluorine gas. Accordingly, the reaction efficiency is high and the control of reaction is easy since the reaction heat is not accumulated, so that the reduction of the yield of polycarbonmonofluoride resulting from the degradation or combustion of polycarbonmonofluoride is readily avoided.

Thus, according to the present invention, the disadvantages and hazards associated with a conventional batch process are eliminated completely.

In the practice of the present invention, it is essential to employ the above-mentioned multistage cylindrical reactor. An example of the preferred reactors is an multistage cylindrical reactor which comprises a body of vertical cylinder, a plurality of trays provided in the body with an appropriate vertical distance and a central rotary shaft provided in the body with extending through the body and trays; the body being provided with a feed port of carbon material and an exhaust port of waste gas mounted to the upper part thereof, and a discharging port of product and a feed port of fluorine gas mounted to the lower part thereof; the tray being provided with a hole formed in the center thereof, whose diameter is larger than that of the rotary shaft so that the rotary shaft can extend through the hole and fluorine gas can pass through the clearance between the hole and rotary shaft and a slit formed in the radial direction thereof from the periphery of the hole; the rotary shaft being transferable in the axial direction thereof and being provided with wipers positioned over each tray, by the transfer in the axial direction of which the spacing between the wiper and the tray can be freely regulated and thereby the powdery solid on each tray can be leveled and wiped off to another tray positioned just downward. According to this construction, the reaction of carbon materials with fluorine gas can be carried out efficiently and the heat transfer can be readily carried out.

Figure 2:
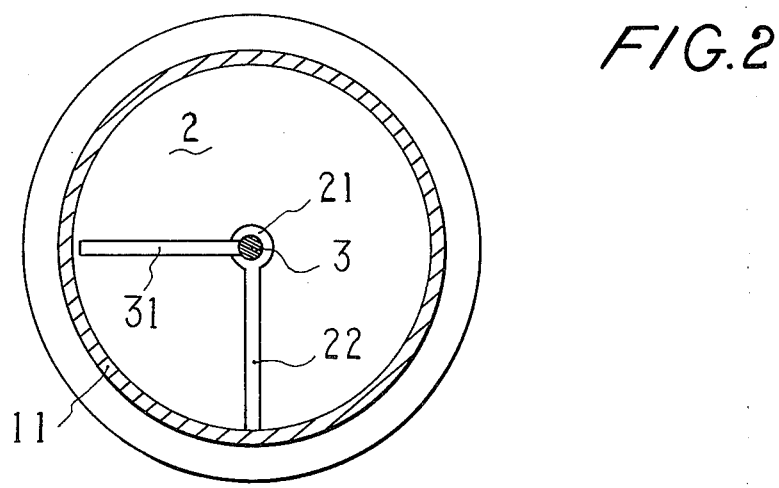
FIG. 2 is a horizontal sectional view of the preferred reactor taken along section line A—A of FIG. 1.

The reactor preferably employed in the practice of the present invention is explained by referring to the drawings. In FIGS. 1 and 2, reference Nos. 1, 2 and 3 identify a body of the reactor, a tray and a rotary shaft, respectively.

The body 1 comprises a plurality of cylinders 11 jointed by means of flange, an upper cover 12 and a bottom cover 13. The upper cover 12 is provided with a feed port of carbon material 12a and an exhaust port of waste gas 12b. To the feed port of carbon material 12a is connected a screw conveyor 12c for carrying carbon materials thereto. To the screw conveyor 12c is connected a hopper 12d for supplying carbon materials thereto. The bottom cover 13 is provided with a discharging port of product 13a, to which a screw conveyor 13b for carrying the product to a desired place is connected. A feed port of fluorine gas 13c is mounted to the side wall of a lower part of the body 1.

The tray 2 is a disc jointed in a body to the cylinder 11, in which a hole 21 is formed in the center and a narrow slit 22 is formed in the radial direction from the periphery of the hole 21. The body 1 consists of a plurality of such cylinders jointed by means of flange. The diameter of the hole 21 is larger than that of the rotary shaft 3. The rotary shaft 3 extends through the hole 21 in the center thereof. Through the clearance between the hole 21 and the rotary shaft 3, fluorine gas rises upward with no difficulty. Generally, the trays are arranged in the reactor so that two slits on adjacent trays do not overlap each other in the vertical direction of reactor. In case of such arrangement, carbon materials drop down one tray by one tray. In a preferred embodiment, the trays are arranged so that two slits on adjacent trays are in opposite direction each other with respect to the rotary shaft 3.

The rotary shaft 3 is arranged with extending through the trays 2, and the upper cover 12 and bottom cover 13, and transferable in its axial direction, with being supported by means of bearings 3a and 3b. The rotary shaft 3 is provided with wipers 31, the bottom size of which is about the same as the size of slit 22. The spacing between the wiper 31 and the tray 2 is regulated freely, for instance, in the range of 1 to 20 mm. by transferring the rotary shaft 3 in its axial direction. The powdery solid on the trays 2 is leveled so that the thickness of the solid layers is uniform by revolving the rotary shaft 3 after regulating the spacing to a proper distance. Otherwise, the powdery solid on the trays 2 is wiped off through the slit 22 to another tray positioned just downward by revolving the rotary shaft 3 after contacting the bottom of the wipers 31 to the upper surface of the trays 2.

In a preferred embodiment, the rotary shaft 3 is provided with buffle plates 32, to which fluorine gas rising through the clearance between each tray 2 and rotary shaft 3 collides to change the direction of flow and contacts sufficiently with the carbon material on each tray 2. In another embodiment of the reactor, the wiper 31 may be arranged in such a manner that it is inserted in the slit 22 by transferring the rotary shaft 3 in its axial direction so that the short-circuit through the slit 22 of fluorine gas rising upward in the reactor does not occur. Another conventional means for clogging the slit 22, for instance, plates, lods, and the like may be adopted for the above-mentioned purpose, if desired.

In further embodiment, the upper surface of the tray and a part of the inside wall of the body being in contact with the carbon material or polycarbonmonofluoride on the trays are subjected to knurling, which reduces the slip of carbon material or polycarbonmonofluoride to make easy the leveling of carbon material or polycarbonmonofluoride.

Next, an embodiment of the present invention carried out by employing the above-mentioned reactor is explained. The following procedures relate to those in a steady state.

A carbon material supplied to the hopper 12d is carried to the feed port of carbon material 12a by the screw conveyor 12c and thrown onto the uppermost tray through the feed port of carbon material 12a. After a proper amount of the carbon material is supplied, the rotary shaft 3 is transferred in its axial direction to regulate the spacing between the trays 2 and wipers 31 to a proper distance and then revolved to level the carbon material into a uniform thickness. Then, the rotary shaft 3 is lifted in its axial direction to transfer the wipers 31 upward. The carbon material on each tray is contacted with fluorine gas supplied from the feed port of fluorine gas 13c. Thus the fluorination of carbon material proceeds. Flourine gas which rises through the clearance between the hole 21 and rotary shaft 3 collides to the buffle plate 32 to change the direction of its flow and then contacts with the carbon material on each tray. In that case, the carbon material is fluorinated homogeneously since it is leveled in a uniform thickness. After the reaction proceeds to a some extent, the wipers 31 being upward are lowered in the axial direction of the rotary shaft 3 to contact with the upper surface of each tray 2. Then, the rotary shaft 3 is revolved and thereby the carbon material on each tray 2 is wiped off through the slit 22 onto a just lower tray. In that case, the fluorinated carbon material, i.e., polycarbonmonofluoride on the bottom cover 13 is taken out of the reactor through the discharging port of product 13a and carried to a proper place by the screw conveyor 13b. After completion of transferring the carbon material from each tray to each lower tray and discharging the product, the rotary shaft 3 is again lifted upward to maintain each wiper 31 over each tray 2 with a proper constant distance. Then, a fresh carbon material is supplied to the uppermost tray through the feed port of carbon material 12a and the above-mentioned procedures are repeated. Thus, the fluorination of carbon material is continuously carried out to continuously give polycarbonmonofluoride. The waste gas of the reaction is exhausted through the exhaust port of waste gas 12b.

By the reactor as mentioned above are exhibited the following advantages:

1. Production capacity per bed area of reactor is widely increased since a plurality of trays are provided in the reactor and the reaction between a carbon material and fluorine gas is carried out continuously on the trays.

2. The reaction proceeds homogeneously since the carbon material on the trays is leveled in a uniform thickness.

3. The reaction efficiency is extremely high since the reaction proceeds with the counter current contact between a carbon material and fluorine gas and thereby the fresh carbon material on an upper tray contacts with a lower concentration of fluorine gas to progress the reaction at a moderate rate without drastic reaction and the carbon material fluorinated to a some extent on a lower tray contacts with a higher concentration of fluorine gas to maintain the reaction rate at a comparative high level.

4. The reaction heat distributes homogeneously in the whole of reactor due to the effect described in the above (3) to avoid a partial overheating.

5. The reaction heat is not scarcely accumulated in the reactor since carbon material and polycarbonmonofluoride which have a low heat conductivity are transferred in succession with increasing degree of fluorination. Accordingly, the reduction of the yield of polycarbonmonofluoride resulting from degradation or combustion of polycarbonmonofluoride is readily avoided.

6. The heat transfer is readily carried out since the tray 2 is fitted in a body to the body 1 of reactor.

The number of trays in the reactor of the present invention varies widely, depending upon a production capacity per bed area of reactor. In general, however, not less than three numbers of trays are preferable. In case the number of trays is less than three, the production capacity per bed area of reactor is reduced, and the effects of the present invention such as the easy control of the reaction and the reduction of the amount of reaction heat accumulated, which are achieved by transferring carbon material and polycarbonmonofluoride, are not exhibited sufficiently.

As a kind of material of reactors, Monel metal, nickel or cupper may be employed in consideration of the corrosion by fluorine gas.

The carbon material employed in the practice of the present invention is not critical and may be either amorphous or crystalline. Examples of carbon materials include amorphous carbons such as carbon black, petoleum coke, petroleum pitch coke and charcoal, and crystalline carbons such as natural graphite and artificial graphite. Such carbon materials can be employed in various forms. Generally, powdery carbon materials having an average particle size of not more than 50 $\mu$ is preferable. However, powdery carbon materials having an average particle size of more than 50 $\mu$ can be also employed sufficiently. In addition to the powdery carbon materials, carbon materials in the forms such as blocks, spheres, bars and fibers can be employed unless the employment of them does not hinder the practice of the present invention.

In the practice of the present invention, the carbon material and partially fluorinated carbon material on the trays 2 are leveled into a layer having a uniform thickness by the wipers 31. The thickness of the carbon layer is from 1 to 20 mm., preferably from 1 to 5 mm. In case the thickness of the carbon layer is more than 20 mm., the amount of reaction heat generated becomes too much so that there is a danger of the degradation of polycarbonmonofluoride, and in some cases, the combustion thereof. In case the thickness of the carbon layer is less than 1 mm., the production capacity per bed area of reactor decreases extremely.

As a fluorine gas, there is employed that prepared by the electrolysis of a solution of $KF \cdot 2HF$ electrolyte. The fluorine gas may be employed as it is, but hydrogen fluoride therein may be removed by a conventional manner. The fluorine gas charged in a bomb which is commercially available can be also employed. The fluorine gas only may be employed. In general, however, it is preferable to employ fluorine gas diluted with other gases such as nitrogen, air, perfluorocarbons of $C_1$ to $C_8$, argon, neon, helium, carbon dioxide, due to the high reactivity of fluorine gas. The dilution ratio of fluorine gas is not critical and may vary appropriately, depending upon the reaction conditions, for instance, a flow rate of the gas mixture and a reaction temperature. Generally, however, a partial pressure of fluorine gas in the gas mixture is from 0.5 to 0.01, preferably from 0.4 to 0.1, since the reaction proceeds at a proper reaction rate, suppresses the formation of by-products and gives polycarbonmonofluoride in a high yield. In case the partial pressure of fluorine gas is more than 0.5, it is much difficult to eliminate the reaction heat since the reaction rate is too large and thereby the amounts of by-products such as perfluorohydrocarbons increase extremely. In case the partial pressure is less than 0.01, the reaction efficiency decreases widely since the reaction rate is too small. The flow rate of gas mixture of fluorine gas and diluent varies depending upon the partial pressure of fluorine gas. In case of employing a powdery carbon material, a flow rate of 1 to 50 cm./sec. is generally preferable. In case the flow rate is more than 50 cm./sec., the powdery carbon material scatters, and in case the flow rate is less than 1 cm./sec., the reaction efficiency decreases widely.

As a reaction pressure in the practice of the present invention, generally, normal pressures are employed. In case of need, however, either elevated pressures or reduced pressures may be employed. In case of carrying out the reaction under a reduced pressure, it may not be necessary to employ the above-mentioned diluent gases and the reaction may be carried out by fluorine gas alone.

As a reaction temperature in the practice of the present invention, the range of from 250° to 600°C. is preferably employed. However, reaction temperature of from 300° to 500°C. is more preferably employed since the control of reaction is more easy and the formation of by-products is more suppressed to give polycarbonmonofluoride in a higher yield. In case the reaction temperature is less than 250°C., the reaction rate is too small, and in case the reaction temperature is more than 600°C., the reaction rate is too large so that the amounts of by-products such as perfluorohydrocarbons increase greatly. As a result, in these cases, the yield of polycarbonmonofluoride is reduced extremely. Generally, with respect to amorphous carbon, reaction temperature is preferably in a range of from 300° to 400°C. and with respect to crystalline carbon, reaction temperature is preferably in a range of from 400° to 500°C.

In the practice of the present invention, the heat for heating a reactor is supplied to the whole of the reactor from an outer heat source. Examples of the outer heat sources include conventional heat sources such as heat transfer salt ($KNO_3$-$NaNO_2$-$NaNO_3$), band heater, combustion gas. Taking into the easiness of temperature control, a heat transfer salt and band heater are preferably employed.

The present invention is also effectively applicable to the fluorination of a part of carbon material, especially only the neighborhood of the surface thereof.

The continuous fluorination of carbon materials of the present invention is extremely excellent as a process for the mass-production of polycarbonmonofluoride in comparison with the conventional batch process and extremely preferable for an industrial purpose.

The present invention is more particularly described and explained by means of the following illustrative Examples.

EXAMPLES 1 to 6

The reactor employed was the multistage cylindrical reactor shown in FIGS. 1 and 2, wherein the height of the body 1 is 1 mm., the inner diameter of the body 1 is 300 mm. and the number of the trays is four.

The experiments of each Example were carried out under desired conditions according to the following operating procedures.

A carbon material stored in the hopper 12d was carried by the screw conveyor 12 and the proper amount thereof was thrown onto the uppermost tray through the feed port of carbon material 12a (hereinafter, this operation is referred to as "one throwing"). Then, the carbon material on the uppermost tray is wiped off onto the tray positioned just downward through the slit 22 by transferring the rotary shaft 3 in its axial direction to contact the bottom surface of each wiper 31 with the upper surface of each tray 2 and revolving the rotary shaft 3. The above operations were repeated in succession to supply the carbon material on every tray. The carbon material supplied on every tray was leveled into a proper thickness by revolving the rotary shaft 3 after regulating the spacing between each tray 2 and wiper 31. Then, a gas mixture of fluorine gas and diluent in which fluorine gas possessing a proper partial pressure was introduced into the reactor through the feed port of fluorine gas 13c to react with the carbon material. The fluorine gas employed was prepared by the electrolysis of solution of KF·2HF electrolyte and hydrogen fluoride therein was removed by trichlene-dry ice trap (−78°C.) and NaF tower. $n$-$C_5F_{12}$ employed as a diluent in Example 6 is liquid at an ordinary temperature (b.p.: 29°C.) and therefore it was mixed with fluorine gas after vaporized. The reactor was heated by a band heater wound on the side wall thereof and the inner temperature of the reactor was regulated to a desired temperature by an automatic temperature controller. After the reaction was progressed to an extent that the carbon material on the lowest tray was almost converted into polycarbonmonofluoride, the carbon material on each tray was transferred onto each just lower tray through the slit 22 by transferring the rotary shaft 3 in its axial direction to contact the bottom surface of each wiper with the upper surface of each tray and revolving the rotary shaft 3 and, at the same time, a fresh carbon material was supplied onto the uppermost tray through the feed port of carbon material 12a. Then, the carbon material on each tray was leveled into a proper thickness in the same manner as in the above and the reaction was further progressed. After the carbon material on the lowest tray was almost converted into polycarbonmonofluoride, the carbon material on each tray was transferred onto each just lower tray in the same manner as in the above. In that case, the solid product, i.e., polycarbonmonofluoride obtained on the bottom cover 13 was taken out of the reactor through the discharging port of product 13a.

The operations as described above were repeated and then the reaction was carried out in a stationary state.

The results obtained in the stationary state are shown in Table 1. In Table 1, the reaction time is the period from the time when a carbon material is supplied to the reactor to the time when the carbon material supplied is taken out as polycarbonmonofluofide, that is to say, a residence time of carbon material in the reactor. The carbon material A is an amorphous carbon having a particle size less than 43 $\mu$ and the carbon material B is a crystalline carbon (artificial graphite) having a particle size less than 38 $\mu$. The amount of the carbon material supplied and yield of the solid product are those per one throwing. The content of fluorine in the solid product is that determined by elementary analysis and the recovery rate of carbon is that calculated from the following equation.

$$\text{Recovery rate of carbon (\% by weight)} = \frac{\left[\text{Yield of solid product (g.)}\right] \times \left(1 - \frac{\left[\text{Content of fluorine in solid product (\% by weight)}\right]}{100}\right)}{\text{Amount of carbon material supplied as starting material (g.)}} \times 100$$

Table 1

| Example No. | Reaction condition | | | | 
|---|---|---|---|---|
| | Partial pressure of fluorine gas | Diluent | Temperature (°C.) | Reaction time (hours) |
| 1 | 0.10 | Nitrogen | 350 | 2.0 |
| 2 | 0.20 | Nitrogen | 350 | 1.0 |
| 3 | 0.15 | Nitrogen | 500 | 1.5 |
| 4 | 0.40 | Nitrogen | 300 | 2.0 |
| 5 | 0.15 | Air | 350 | 2.0 |
| 6 | 0.40 | n-$C_5F_{12}$ | 300 | 2.0 |

| Example No. | Carbon material Kind | Carbon material Amount supplied(g.) | Yield of solid product(g.) | Content of fluorine in solid product (% by weight) | Recovery rate of carbon (% by weight) |
|---|---|---|---|---|---|
| 1 | A | 72.2 | 176.5 | 61.1 | 95.2 |
| 2 | A | 61.6 | 139.0 | 60.1 | 90.0 |
| 3 | B | 72.2 | 160.0 | 60.2 | 88.0 |

Table 1-continued

| Example No. | Reaction condition | | | | |
|---|---|---|---|---|---|
| | Partial pressure of fluorine gas | | Diluent | Temperature (°C.) | Reaction time (hours) |
| 4 | A | 72.2 | 166.5 | 61.0 | 90.0 |
| 5 | A | 72.2 | 170.8 | 61.2 | 92.0 |
| 6 | A | 72.2 | 178.3 | 62.0 | 94.0 |

What is claimed is:

1. A process for the continuous fluorination of carbon materials in a vertical reactor, said reactor having a top and bottom cover, feed and exhaust ports in the top cover and feed and exhaust ports in the bottom portion of the reactor and a plurality of horizontal trays vertically spaced along the internal surface of the reactor, which comprises the steps of:
   a. introducing continuously a carbon material being selected from the group consisting of carbon black, coke, pitch coke, charcoal, artificial graphite and natural graphite,
   b. distributing the carbon material onto each of the trays and forming a thin layer thereon,
   c. introducing a fluorine gas or a mixture of fluorine gas and diluent continuously into the bottom part of the reactor,
   d. reacting the carbon material on each of the trays with the gas at elevated temperature in the range from 250° to 600°C,
   e. transferring the carbon material simultaneously from each of the trays to the tray below while continuing the reaction, and
   f. removing the fluorinated carbon material continuously through an exhaust port in the bottom portion of the reactor.

2. The process of claim 1, wherein said fluorination temperature is from 300° to 500°C.

3. The process of claim 1, wherein said fluorination is carried out under a partial pressure of said fluorine gas from 0.01 to 0.5.

4. The process of claim 3, wherein said partial pressure is from 0.1 to 0.4.

5. The process of claim 1, wherein said gas mixture of fluorine gas and diluent has a flow rate from 1 to 50 cm./sec.

6. The process of claim 1, wherein the carbon material on each tray is leveled into a proper thickness.

7. The process of claim 6, wherein said thickness is from 1 to 20 mm.

8. The process of claim 6, wherein said thickness is from 1 to 5 mm.

9. The process of claim 1, wherein said carbon material is a powdery carbon having an average particle size of not more than 50 $\mu$.

10. The process of claim 1, wherein said diluent is selected from the group consisting of nitrogen, air, perfluorocarbon of $C_1$ to $C_8$, neon, helium and carbon dioxide.

* * * * *